(No Model.)
N. TROWBRIDGE.
CULTIVATOR.
No. 296,800. Patented Apr. 15, 1884.
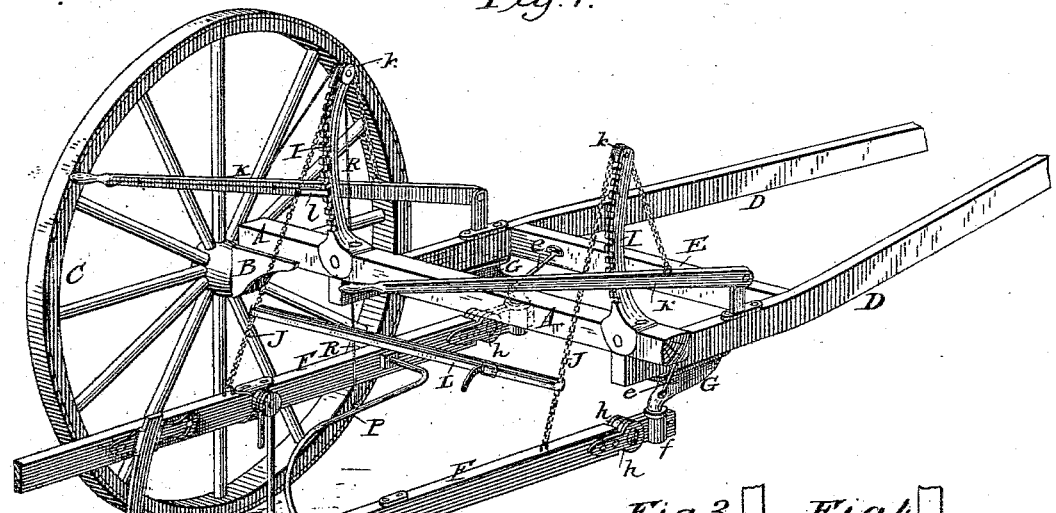
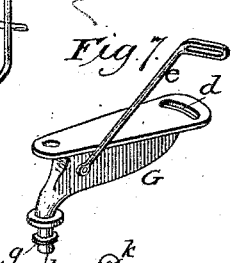
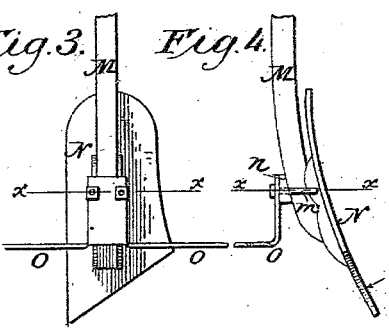
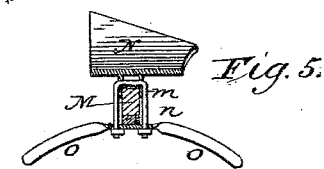
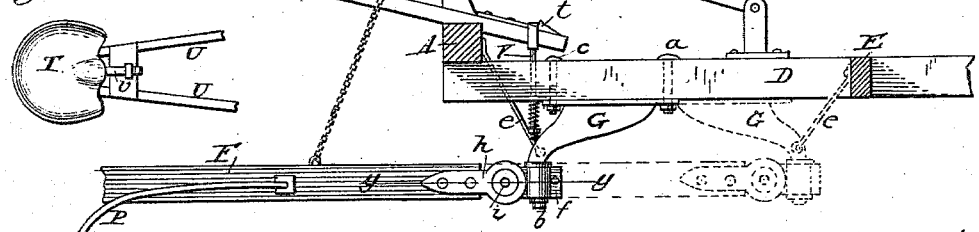
Attest.
Sidney P. Hollingsworth
Newton Wyckoff.
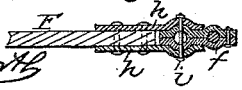
Inventor.
Newton Trowbridge
By his Attorneys
Philip T. Dodge

UNITED STATES PATENT OFFICE.

NEWTON TROWBRIDGE, OF COUNCIL GROVE, KANSAS.

CULTIVATOR.

SPECIFICATION forming part of Letters Patent No. 296,800, dated April 15, 1884.

Application filed August 8, 1882. (No model.)

*To all whom it may concern:*

Be it known that I, NEWTON TROWBRIDGE, of Council Grove, in the county of Morris and State of Kansas, have invented a new and useful cultivator for the cultivation of corn, tobacco, and other rowed crops, embodying new principles and combinations, as is fully set forth in the following specification and accompanying drawings.

My invention relates to that class of straddle-row cultivators wherein a wheeled draft-frame is combined with two laterally and vertically swinging shovel-beams coupled thereto, and particularly to those machines which are convertible at will, in order to adapt them to be operated by an attendant riding upon the machine or by an attendant walking behind the same.

The invention relates to various features of construction, which will be hereinafter described in detail, but particularly to a reversible bracket, whereby the connection of the shovel-beams with the draft-frame may be shifted forward and backward, according as the machine is to be adjusted to carry the operator or not; in shovels provided with horizontal blades following thereafter beneath the surface of the ground, for the purpose of severing and destroying weeds; in various details of construction relating thereto; in combining with flexible chains or equivalent supports, by which the beams are carried, an adjustable connection between said chains, whereby the normal distance between the beams may be varied to suit the distance between the rows of plants; in a weed-pulling arm of peculiar construction adapted to enter slightly beneath the surface of the ground and remove weeds, at the same time loosening the soil adjacent to the plants, and in a peculiar manner of supporting and adjusting the detachable seat.

Referring to the accompanying drawings, Figure 1 represents a perspective view of my machine, the wheel on one side being removed the better to expose the other parts to view, and the beam on one side being shown in its forward adjustment, while that upon the other side is moved backward for the purpose of illustrating the character of such adjustment. Fig. 2 represents a longitudinal vertical section through the center of the frame of the machine. Figs. 3 and 4 are respectively a rear and an edge view of one of the main shovels and the attendant cutting-blades. Fig. 5 is a vertical cross-section on the line $x\ x$, Figs. 3 and 4, looking downward. Fig. 6 is a vertical cross-section on the line $y\ y$, Fig. 2, illustrating the construction of the coupling by which the beams are connected to the main frame. Fig. 7 is a perspective view of the reversible bracket and brace by which the beams are adjustably connected with the main frame. Fig. 8 is a top plan view of the adjustable seat and its supporting-arms.

Referring to the drawings, A represents the horizontal main axle, provided at its ends with longitudinal adjustable brackets B, which are formed with journals to receive the main supporting-wheels C, of which there will be, as usual, one at each side of the machine. The brackets B will be slotted and secured to the axle by bolts, or otherwise applied, in order to admit of their being adjusted to vary the distance between the main wheels.

D D represent two frame-bars secured at their rear ends beneath opposite ends of the axle, and extended thence forward, their forward ends being joined to each other, as usual in this class of machines. The rear ends of these bars D are extended forward from the axle parallel to each other for a short distance, and are then connected by a cross-bar, E, bolted or otherwise secured firmly between them. From the bar E downward the two ends will converge to the point of union.

F F represent the two backwardly-extending drag-bars, to which the shovels and their cultivating devices are attached.

Each beam is jointed at its forward end, in the manner hereinafter explained, to a reversible bracket, G, secured to the under side of the main frame. Each bracket G is connected at one end by a vertical bolt or pivot, $a$, to the main frame, and is provided at the opposite end with a depending arm or journal, $b$, to which the beam-coupling is attached. The pivotal attachment of the bracket to the frame admits of the bracket being turned horizontally forward or backward. When the bracket is turned backward, as represented by full lines in Figs. 1 and 2, the point of draft for the beam is brought near the axle and the machine balanced in a suitable manner to be operated by an attendant walking behind the same. When, however, the bracket is turned forward to the position represented by dotted lines in Fig. 2, the point of draft is shifted forward in suitable position for the machine to be operated by an attendant riding thereon on a seat extending in rear of the axle, as will be hereinafter described.

The bracket may be fastened in position after adjustment in any suitable manner. I prefer, however, to employ a fastening-bolt, $c$, for the purpose, passing the same through a transverse slot, $d$, in the end of the bracket, this slot being clearly represented in Fig. 7, thus permitting the bracket to be adjusted laterally, as may be required, to vary the distance between the beams or drag-bars.

For the purpose of giving additional stability to the brackets, I provide them each with a brace arm or rod, $e$, which is bolted to the cross-bar E or to the axle, according to the position in which the bracket is placed. In order that this brace may not interfere with the lateral adjustment of the brackets, its end is provided with a slot to receive the fastening, as indicated in Figs. 1 and 7.

It will be observed that the reversible bracket, constructed as above, admits of the point of attachment between the drag-bars and frame being shifted forward and backward quickly as occasion may require. The essential feature of the invention in this regard consists in the employment of a swinging bracket or arm as a connection between the frame and the beam, and it is manifest that the form and details of construction may be modified without departing from the limits of the invention.

Passing now to the jointed connection between the drag-bars and the brackets G, attention is directed particularly to Figs. 1, 2, and 6. It will be observed that the vertical journal depending from the bracket is encircled by a horizontally-swinging clamp, $f$, composed of two corresponding plates applied on opposite sides and united by transverse bolts. As shown in Fig. 7, the vertical journal is encircled near its middle by a flange or collar, $g$, which enters a corresponding groove in the clamp $f$, to prevent the latter from moving vertically. The two plates forming the clamp $f$ are embraced and held between two plates, $h\ h$, bolted to opposite sides of the beam, as plainly represented in the various figures, the plates $h$ and clamp $f$ being united by a horizontal bolt or pivot, $i$, which admits of the beam swinging vertically.

For the purpose of relieving the bolt from excessive strain and strengthening the connection between the parts, each of the clamp-plates $f$ is provided with a hemispheric protuberance, which enters a corresponding recess in the contiguous plate $h$, as shown in Fig. 6.

It will be observed that the joint composed of the parts above described admits of the beams swinging vertically and laterally, and at the same time prevents them from rocking or rolling sidewise.

For the purpose of limiting the descent of the beams and of enabling the operator when riding upon the machine to elevate the same at will, I mount on each end of the axle an upright notched bar or rack, I, bearing at its upper end a small pulley, $k$. A chain, J, is attached to the beam, and passed thence upward over the pulley $k$ and downward to a hand-lever, K, which latter is pivoted to a standard on the main frame and extended rearward in a suitable position to be within reach of the attendant while riding upon the machine. Each lever is provided with a latch or locking device, $l$, to engage in the notched bar or standard, and with a wire or equivalent device extending backward from said latch to the rear end of the handle. By operating the hand-lever the attendant may raise and lower the beams at will, and by locking the lever fast to the standard may limit the descent of the beams and shovels at any required point.

In the practical operations of the machine it is frequently found necessary to adjust the shovels to throw the earth inward toward the center. When thus adjusted, the resistance of the earth against the shovels tends to crowd them outward and throw the beams apart. In order to overcome this tendency and relieve the operator from the labor which would otherwise be required in keeping them in position, I apply an adjustable connection between the beam-suspending chains J. This connection may be of any suitable character; but I employ, ordinarily, as the most simple means for the purpose a strap, L, provided with a buckle or equivalent adjusting device extending around the two chains in the manner represented in Fig. 1. This connection may be applied at any suitable distance above the beams. After adjusting the shovels and commencing operations with the machine, the connection is shortened until it is found that the beams travel in the proper position, and this adjustment is permitted to remain. It will be observed that the connection thus applied to the flexible suspending devices does not prevent the operator from moving the beams laterally, as may be required, its effect being simply to hold them normally in their proper positions.

To each beam I apply as usual on opposite sides two standards, M, each having at the lower end a shovel, N. These shovels are of a somewhat peculiar form. As shown in Figs. 3 and 4, each shovel has its point beveled or cut away on one side only, the remaining side or edge being straight or vertical from the top downward to the point. In horizontal section the shovel has a flat face, without lateral curvature or inclination at any point within its length. In vertical section the face of the shovel is made flat from the point upward for a distance of about two inches, and from that point to the top is given a gradually-increasing curvature. The effect of this peculiar conformation is to cause the shovel to scour or work smoothly and cleanly without the adherence of earth thereto in all kinds of soil.

For the purpose of cutting and destroying weeds, I connect with each shovel two horizontal cutting-blades, O, located in rear thereof and extending laterally therefrom. These blades may be attached in any suitable manner; but I prefer to retain the details of construction represented in Figs. 1, 3, 4, and 5. Referring to these figures, it will be seen that the two blades extend from opposite sides of a central plate, and that this plate is connected, by means of a stirrup-bolt, $m$, to the rear side of the shovel-standard, so that as the shovel is adjusted vertically the horizontal blades will be correspondingly adjusted.

In order to retain the edge of the blade in proper cutting position, notwithstanding the rocking or tipping adjustment which may be given the shovel, I introduce between the plate on which the blades are formed and the standard a reversible bevel block or washer, $n$. By properly adjusting this block the blades O may be kept in their proper horizontal position, notwithstanding variations in the inclinations of the shovel. In practice the blades O are adjusted in such relation to the shovel as to travel ordinarily beneath the surface of the ground a distance of from three to four inches.

For the purpose of removing dead stalks of the previous season, which may lie transversely of the rows, I employ hooked arms P, which may be similar in form to those at present known in the art. There may be one or more of these hooks attached to the beams by being passed through the same, and provided with a nut, as shown, or otherwise attached. In ordinary cases it is sufficient to apply the stalk-lifter to one of the two beams. It is preferred, as shown in the drawings, to pass the upper end of the lifter-arm through the beam, and provide the same with a screw-thread and with fastening-nuts to admit of its being adjusted laterally.

In order to secure the proper elevation of the stalk-hook when the beams are elevated, I attach thereto a cord, R, which is extended upward over the guide-pulley on the upper end of the standard I, and thence downward to the hand-lever, so that when the lever is depressed to elevate the beam it will also elevate the stalk-lifter independently of the beam. This connection is rendered necessary by the fact that the stalk-hook is attached near the forward end of the beam, the vertical motion of which is so slight that it cannot be relied upon to throw the stalk-lifter clear of the surface.

In certain sections of country it is found that the surface of the earth becomes dry and baked to a considerable degree of hardness adjacent to the plants. To secure the proper growth of the plants, it is desirable that this baked earth—commonly known as "heated earth"—shall be removed from the plants preparatory to the placing of fresh earth against them by the main shovels. For this purpose I propose to apply to each beam, in advance of the main shovel, a small leading-shovel, Q, such as represented in Fig. 1. This shovel, which will have a straight point in the side next to the corn, and be beveled on the opposite side only, is adjusted to follow in front of the main shovel, and to enter the ground to a distance of ordinarily from one and a half to two inches. It will be arranged to travel close to the plants and to remove only a small portion of dry earth lying immediately against them. This being removed, it will be replaced by fresh moist earth as the main shovels advance, the result being in practice that what is commonly known as "burning" the plants is avoided.

For the purpose of removing weeds during the earlier stages of cultivation, I propose to apply to each beam a device which I denominate a "weed-puller," (shown at S, Fig. 1.) This puller consists of an arm or rod secured to the beam, and extending thence downward and inward, with its lower end curved somewhat backward, and terminating in a point, $p$, and in an arm, $q$, extending outward and rearward from said point in substantially a horizontal direction. This device is adjusted in such position that when in practice the horizontal arm $a$ will travel beneath the surface of the ground to the distance of from one and a half to two inches, with the point $p$ passing closely beside the plants.

It will be observed that the weed-pulling device operates to destroy the weeds on that portion of the surface which is not reached by the blades O, attached to the shovels.

Passing next to the seat upon which the attendant rides, reference is made to Figs. 2 and 8. This seat (represented at T) is sustained upon the rear end of two forwardly-diverging arms, U, which rest upon the main axle as a fulcrum, and have their forward ends inserted through eyes or sockets formed on the upper ends of vertical sliding rods V. The rods V are passed downward, one through each of the frame-bars D, and are provided on the lower ends with spiral springs and nuts, by which the tension of the springs may be increased or diminished. These sliding rods and the springs applied thereto sustain the seat with a spring action and admit of its rising and falling to a limited extent.

To prevent the seat-sustaining arms U from being accidentally withdrawn, I propose to provide each one at the forward end with a spring hook or latch, $t$, to pass through and engage with the upper end of the vertical rod, as shown in Fig. 2.

In order that the seat may be adjusted and retained in a substantially horizontal position notwithstanding the variations in the inclination of the supporting-arms U, I provide the seat with a vertical sector-plate, *u*, pivoted at its rear edge between the two arms, and provided at its front edge with a series of notches or teeth to engage with a latch or bolt, *v*, applied to the supporting-bars. By disengaging the latch *v* the seat is released, and may then be adjusted as required and again secured by replacing the latch.

Having thus described my invention, what I claim is—

1. In a cultivator, a wheeled main frame, in combination with a drag-bar or beam and an intermediate connecting-bracket pivoted to the main frame, and reversible end for end thereon, as described, whereby the point of connection between the beam and frame may be moved forward and backward.

2. In combination with the wheeled main frame and the drag-bar F, the intermediate reversible bracket, G, pivoted to the main frame, and provided with the journal to receive the beam-coupling, substantially as described and shown.

3. In combination with the main frame and the reversible bracket G, as described, the brace rod or arm *e*, adapted for connection with the frame in the two positions described.

4. The combination, with the main frame and the drag-bar, of the beam, the pivoted reversible bracket G, provided with the slot *d*, and with the brace-arm *e*, having the slotted end, as shown, whereby the bracket is adapted to be reversed end for end and also to be adjusted laterally.

5. In combination with a cultivator-shovel having a flat curved surface, substantially as shown, two cutting-blades, *o*, located in rear of said shovel, and extending horizontally beyond its opposite sides, said blades being adjusted above the point of the shovel and adapted to travel beneath the surface of the ground.

6. In combination with a cultivator-shovel, the rear plate provided with the two laterally-extending knives, and the intermediate bevel-block or washer, *n*, substantially as and for the purpose set forth.

7. In a cultivator, the combination of the following elements: a wheeled main frame, two laterally-swinging beams or drag-bars, a flexible chain or suspending device attached to each beam, a device, substantially as shown, adjustable in length, connecting the suspension devices one with another, whereby the suspending devices may be subjected to lateral strain and caused to maintain the beams normally at a given distance apart, while permitting said distance to be momentarily varied at the will of the operator.

8. In combination with the laterally-swinging beams or drag-bars F F and the chains J J, the adjustable connecting-strap L, substantially as shown.

9. In combination with the seat-supporting arms, the pivoted seat provided with the notched plate *u*, and the sliding bolt *v*, mounted upon the arm and arranged to engage with the edge of said plate, as described and shown.

NEWTON TROWBRIDGE.

Witnesses:
W. J. MACKENZIE,
GEORGE A. McMILLAN.